Patented Sept. 12, 1950

2,522,268

UNITED STATES PATENT OFFICE 2,522,268

ACCELERATORS OF VULCANIZATION

Albert F. Hardman, Akron, Ohio, assignor to Wingfoot Corporation, Akron, Ohio, a corporation of Delaware No Drawing. Application September 17, 1945, Serial No. 616,966

2 Claims. (Cl. 260—785)

This invention relates to the use of the methylol esters of dithiocarboxylic acids as accelerators of the vulcanization of rubber. These new compounds and their preparation are claimed in my copending application Serial No. 508,404, filed October 30, 1943, now abandoned.

The acids from which the new compounds are formed are dithiocarboxylic acids (R—CSSH) in which the acid group (—CSSH) is directly connected with a carbon of the acid residue (R—). Ordinarily, this residue will be a hydrocarbon radical although this is not necessarily the case. The dithiocarboxylic acids include, for example, dithiofuroic acid; dithionaphthoic acid; hydroxy dithionaphthoic acids, such as 2-hydroxy-1-dithionaphthoic acid and 1-hydroxy-2-dithionaphthoic acid, etc.; dithioacetic acid; dithiobenzoic acid, etc. The methylol esters may be formed by treating the free dithiocarboxylic acid with formaldehyde or by treating a salt of the acid with formaldehyde in acid solution. The following examples illustrate the production of these new compounds:

EXAMPLE 1

Methylol Dithiofuroate

| | | |
|---|---|---|
| Ammonium dithiofuroate in 150 cc. water | g | 16 |
| Concentrated HCl | g | 11 |
| Formaldehyde (37%) | g | 10 |
| Ice and water | cc | 200 |

The aqueous ammonium dithiofuroate was slowly stirred into a mixture of the hydrochloric acid, formaldehyde, water, and ice. In a few minutes crystals separated. After standing one-half hour, the precipitate was filtered and washed with cold water. It was the desired methylol dithiofuroate.

EXAMPLE 2

| | | |
|---|---|---|
| Crude disodium-2-hydroxy-1-dithionaphthoate in 200 cc. water | g | 35 |
| Concentrated HCl | cc | 20 |
| Formaldehyde (37%) | g | 15 |
| Water | cc | 400 |

The aqueous solution of the dithionaphthoate was slowly stirred into a solution of the formaldehyde, acid, and water at room temperature. Orange-colored crystals separated at once. After standing several hours, the solution was filtered, and the precipitate of the methylol-2-hydroxy-1-dithionaphthoate was washed with water.

The efficacy of the accelerators is illustrated by the following example.

The product of Example 2 was tested in natural rubber as follows:

| | |
|---|---|
| Rubber | 100.0 |
| Sulfur | 3.0 |
| Zinc oxide | 5.0 |
| Accelerator | 0.5 |

After curing 20 minutes at 240° C., on test it showed a tensile of 171 kg./sq. cm.; 790 per cent elongation on a modulus of 14 at 300 per cent elongation.

In addition to natural rubber, various synthetic rubber-like materials which are similarly vulcanizable may also be used and, for the purposes of this invention, are to be considered as equivalent of natural rubber. This is illustrated by the following example.

The product of Example 1 was tested in a rubber-like copolymer of styrene and butadiene, such as is now known as GR—S, in the following formula:

| | |
|---|---|
| GR—S | 100.0 |
| Sulfur | 2.0 |
| Zinc oxide | 5.0 |
| Carbon black | 40.0 |
| Accelerator | 1.0 |

On curing for 50 minutes at 260° C., a test gave a tensile strength of 141 kg./sq. cm., 465 per cent elongation and a modulus of 117 at 300 per cent elongation.

It is to be understood that the examples are merely illustrative. The amount of sulfur and accelerator, etc., may be changed, and the compositions may be otherwise varied.

This application is a continuation-in-part of my copending application Serial No. 508,406, filed October 30, 1943, now abandoned.

What I claim is:

1. A method of treating rubber which comprises vulcanizing it in the presence of sulfur and, as an accelerator, a small amount of the methylol ester of dithiofuroic acid.

2. A rubber product which has been vulcanized in the presence of sulfur and, as an accelerator, a small amount of the methylol ester of dithiofuroic acid.

ALBERT F. HARDMAN.

REFERENCES CITED

The following references are of record in the file of this patent:

UNITED STATES PATENTS

| Number | Name | Date |
|---|---|---|
| 2,238,331 | Lichty | Apr. 15, 1941 |
| 2,469,824 | Hardman | May 10, 1949 |